(12) United States Patent
Anma et al.

(10) Patent No.: US 6,998,750 B2
(45) Date of Patent: Feb. 14, 2006

(54) PERMANENT MAGNET TYPE THREE-PHASE AC ROTARY ELECTRIC MACHINE

(75) Inventors: Tatsuya Anma, Schuuchi-gun (JP); Tadashi Takano, Schuuchi-gun (JP)

(73) Assignee: Kabushiki Kaisha Moric, Mori-Machi (JP)

( * ) Notice: Subject to any disclaimer, the term of this patent is extended or adjusted under 35 U.S.C. 154(b) by 549 days.

(21) Appl. No.: 09/683,997

(22) Filed: Mar. 11, 2002

(65) Prior Publication Data

US 2002/0130578 A1    Sep. 19, 2002

(30) Foreign Application Priority Data

Mar. 15, 2001   (JP) .............................. 2001-073417

(51) Int. Cl.
*H02K 1/00* (2006.01)

(52) U.S. Cl. ........................ 310/198; 310/184; 310/179

(58) Field of Classification Search ................ 310/179, 310/184, 185, 198, 201, 208, 260
See application file for complete search history.

(56) References Cited

U.S. PATENT DOCUMENTS

| | | | | |
|---|---|---|---|---|
| 2,575,716 A | * | 11/1951 | Kilgore | ....................... 318/771 |
| 3,476,964 A | | 11/1969 | Willyoung | ................... 310/179 |
| 4,774,428 A | * | 9/1988 | Konecny | ..................... 310/198 |
| 5,006,745 A | * | 4/1991 | Nishio et al. | ................ 310/177 |
| 6,133,663 A | | 10/2000 | Hoemann | .................... 370/180 |
| 6,281,609 B1 | * | 8/2001 | Itami et al. | ................ 310/68 B |

FOREIGN PATENT DOCUMENTS

| | | |
|---|---|---|
| EP | 0872943 | 10/1998 |
| JP | 2001197696 | 7/2001 |
| JP | 2001309625 | 11/2001 |

OTHER PUBLICATIONS

European Search Report dated Jun. 27, 2002. for EP 02005917.

* cited by examiner

*Primary Examiner*—Dang Le
(74) *Attorney, Agent, or Firm*—Ernest A Beutler

(57) ABSTRACT

Several embodiments of permanent magnet type three-phase AC rotary electric machines wherein the phase current flow is formed by parallel circuits formed by a plurality of serial circuits each comprising one or a plurality of stator coils so that electromagnetic voltage or counter electromagnetic voltage generated across opposite ends of the plural serial circuits may be always almost the same. Thus, a circulating current does not flow in the parallel circuits, whereby the efficiency of the rotary electric machine can be improved. Also, since the line current circuit of each of the phases is constituted of a parallel circuit, the current flowing in each of the stator coils is small so that the diameter of the stator coil wire can be small. Thus, the winding of the coils can be improved. Also, the processing of the coil terminals is facilitated and the processed portions of the terminals can be made small, resulting in a compact rotary electric machine.

9 Claims, 9 Drawing Sheets

F=Forward
R=Reverse
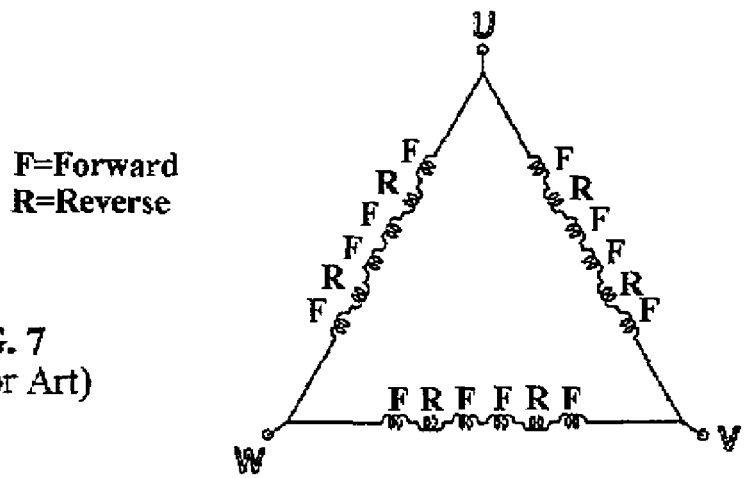
FIG. 7
(Prior Art)
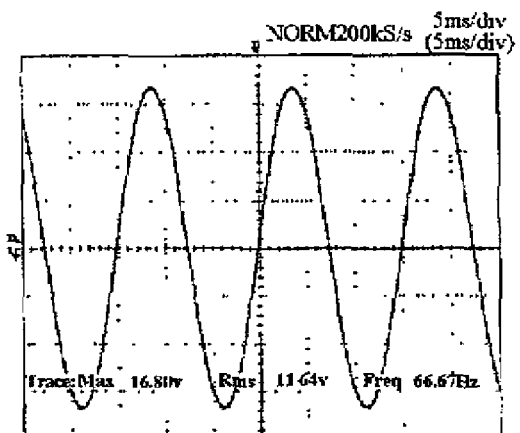
FIG. 8
(Prior Art)
FIG. 9 (Prior Art)
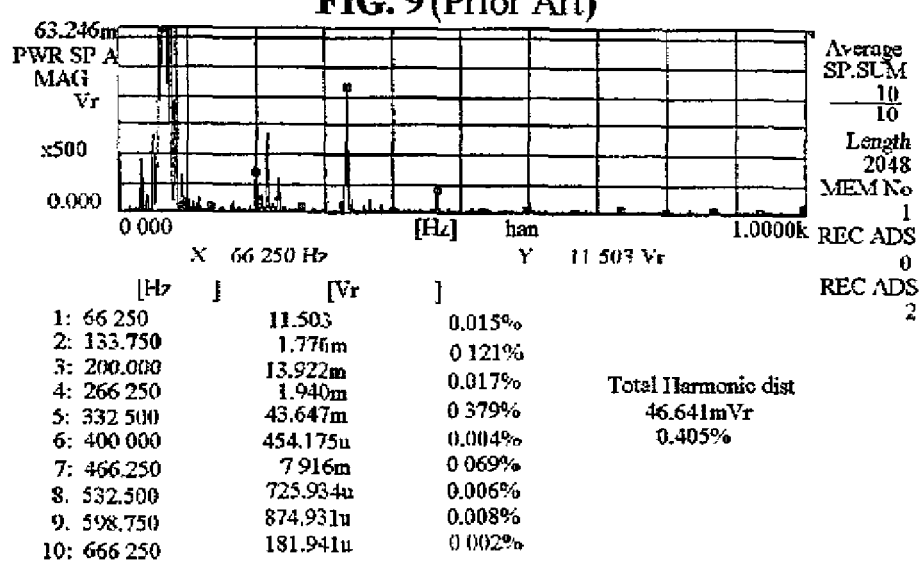
FIG. 10 (Prior Art)

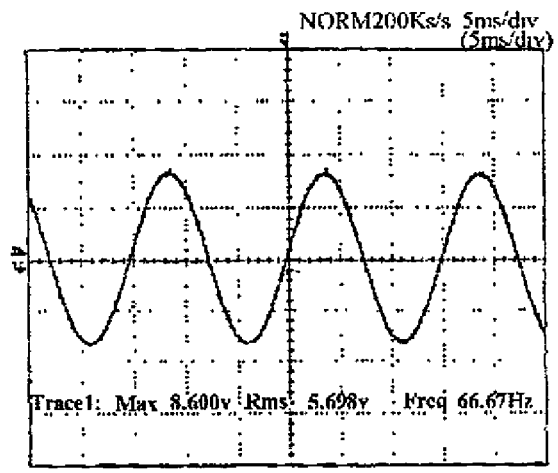
FIG. 11
FIG. 12
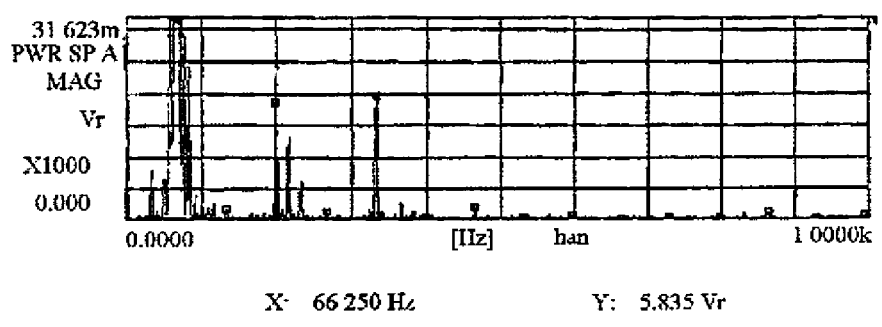
| [Hz] | [Vr] | | |
|---|---|---|---|
| 1. 66.250 | 5.835 | | |
| 2: 132.500 | 1.845m | 0.032% | |
| 3: 198.750 | 18.777m | 0.322% | |
| 4  266.250 | 1.133m | 0.019% | Total Harmonic dist. |
| 5. 332.500 | 19.801m | -0.339% | 27.461mVr |
| 6: 398.750 | 63.237u | 0.001% | 0.471% |
| 7: 465.000 | 1.866m | 0.032% | |
| 8  531.250 | 289.257u | 0.005% | |
| 9· 597.500 | 429.187u | 0.007% | |
| 10. 665.000 | 89.289u | 0.002% | |
FIG. 13

F=Forward
R=Reverse

F=Forward
R=Reverse

| Number n of poles \ Number m of slots | 3 | 6 | 9 | 12 | 15 | 18 |
|---|---|---|---|---|---|---|
| 2 | 6 / 0.866 | 6 / 0.5 | 18 / 0.328 | 12 / 0.250 | 30 / 0.199 | 18 / 0.167 |
| 4 | 12 / 0.866 | 12 / 0.866 | 36 / 0.617 | 12 / 0.433 | 60 / 0.389 | 36 / 0.328 |
| 6 | 6 / 0 | 6 / 1.0 | 18 / 0.866 | 12 / — | 30 / 0.380 | 18 / 0.433 |
| 8 | 24 / 0.866 | 24 / 0.866 | 72 / 0.945 | 24 / 0.866 | 120 / 0.711 | 72 / 0.616 |
| 10 | 30 / 0.866 | 30 / 0.5 | 90 / 0.945 | 60 / 0.933 | 30 / 0.866 | 90 / 0.753 |
| 12 | 12 / 0 | 12 / 0 | 36 / 0.866 | 12 / — | 60 / 0.910 | 36 / 0.866 |
| 14 | 42 / 0.866 | 42 / 0.5 | 126 / 0.617 | 84 / 0.933 | 210 | 126 / 0.902 |
| 16 | 48 / 0.866 | 48 / 0.866 | 144 / 0.328 | 48 / 0.866 | 240 / 0.952 | 144 / 0.945 |
| 18 | 18 / 0 | 18 / 1.0 | 81 / 0 | 36 / — | 90 / 0.910 | 18 / — |
| 20 | 60 / 0.866 | 60 / 0.866 | 180 / 0.328 | 60 / 0.433 | 60 / 0.866 | 180 / 0.945 |
| 22 | 66 / 0.866 | 66 / 0.5 | 198 / 0.9024 | 132 / 0.711 | 330 / 0.617 | 198 / 0.902 |
| 24 | 24 / 0 | 24 / 0 | 72 / 0.866 | 24 / 0 | 120 / 0.381 | 72 / 0.866 |

Upper Row: cogging torque frequency  Lower row: winding coefficient

Line x: $m = (3/4) \times n$
  short-pitch winding coefficient 0.866
  distributed winding coefficient Line y: $m = (3/2) \times n$
  short-pitch winding coefficient 0.866
  distributed winding coefficient Region Z: $(2/3)m < n < (4/3)m$

FIG. 20

PERMANENT MAGNET TYPE THREE-PHASE AC ROTARY ELECTRIC MACHINE

BACKGROUND OF INVENTION

This invention relates to a rotary multi-phase electrical machine, such as a three-phase AC generator and a three-phase AC motor and more particularly to an improved coil winding arrangement therefore.

Three-phase AC generators or motors are well known for many applications. Brushless electric motors are examples of machines of this type. In the conventional rotary electric machine, connected coil winding coils formed on magnetic pole teeth cooperate with permanent magnets. Upon relative rotation of the coil windings and permanent magnets, an electromotive force is induced in each coil (in the case of a generator) or a torque is generated in the rotor (in the case of a motor). The electromotive force or a counter electromotive force generated in each phase or line is the vector sum of effects of the coils in each phase or line.

In rotary electric machines widely used in home appliances or for industrial applications, the supply or output voltage is relatively high. Thus, it is possible to use for the coil windings a flexible winding having a small diameter wound on the magnetic pole teeth in each phase or line. These windings are connected normally in series with either a Y-connection or a Δ-connection. The winding directions of the stator coils are alternated so that the polarities of the coils may be the same.

In addition to home or industrial application, these types of rotary electric machines are widely used in vehicles such as automobiles and motorcycles. For example, blushless motors are employed as a power source for an electric vehicle or the like. In general, the supply voltage in such a vehicle is lower than those for home or industrial uses. Thus, a heavy current must be applied to obtain a high power. Therefore, in a rotary electric machine for a vehicle, the number of turns of a coil wire wound on each core is relatively small, and the diameter of the coil wire is relatively large.

However, when a coil wire having a large diameter is used, the efficiency of winding the coil wire on magnetic pole teeth is significantly lowered. Also, the ends of coil wires in each phase must be connected at coil ends and a neutral connection must be made. The resulting processing is slow and difficult resulting in reduced production capacity and high cost. Additionally, the connections at coil terminals are unavoidably large, resulting in a large-size winding assembly and consequently, a large generator or motor.

It is possible to connect the coils in each phase in parallel to lower the current therein. If this is done, a winding having a smaller diameter can be employed. This permits the number of turns of each coil to be increased. Because the voltage is low in rotary electric machine used in vehicles, the increase in number of turns can be relatively small.

However, it has been found that, when the coils of each phase are connected in parallel, a circulating current is generated in a closed circuit formed of the coils connected in parallel by a phase difference of an electromotive force or a counter electromotive force generated in each coil, resulting in performance deterioration.

It is, therefore, a principal object of this invention to provide a permanent magnet type three-phase AC rotary electric machine that has parallel windings, but also prevents or reduces any circulating current from flowing.

It is a further object of this invention to provide a permanent magnet type three-phase AC rotary electric machine having a small diameter coil windings to permit reduction in the size of the machine.

SUMMARY OF INVENTION

This invention is adapted to be embodied in a permanent magnet type three-phase AC rotary electric machine including a permanent magnet element and a coil winding element. These elements are relatively rotatable. The coil winding element is wired in three phases connected to a line current circuit. Each phase is comprised of a parallel circuit formed by connecting a plurality of series circuits in parallel. The cores used in each of the series circuits are so combined that electromotive voltages or counter electromotive voltages generated across opposite ends of the plurality of series circuits of each phase are substantially the same based on symmetry of arrangement of the permanent magnets and the coils, thereby preventing generation of a circulating current in the parallel circuit.

In accordance with another feature of the invention, the permanent magnet element has n-number of permanent magnet poles. The coil winding element has m-number slots. The value of m is at least 6.

BRIEF DESCRIPTION OF DRAWINGS

FIG. 7 is a schematic wiring diagram, in part similar to FIG. 6, and shows another type of prior art type of device that is Δ wired.

FIG. 8 is a graphical view showing the circuit wave output of the prior art type device shown in FIG. 7.

FIG. 9 is a graphical view showing the sum of the harmonic frequency of the waveform of the line making up the line voltage.

FIG. 10 is a table showing the total harmonic variations in the waveform from FIG. 9.

FIG. 11 is a waveform view, in part similar to FIG. 8, but shows the waveform of the circuit illustrated in FIGS. 3 and 4.

FIG. 12 is a harmonic distribution curve, in part similar to FIG. 9, but showing the construction for this embodiment.

FIG. 13 is a table showing the total harmonic distribution in accordance with this embodiment of the invention.

FIG. 20 is a graphical view showing the relationship of the number of slots, number of poles and cogging torque frequencies and winding coefficients of the various parameters set forth in this table for comparison purposes.

DETAILED DESCRIPTION

Figure 1:
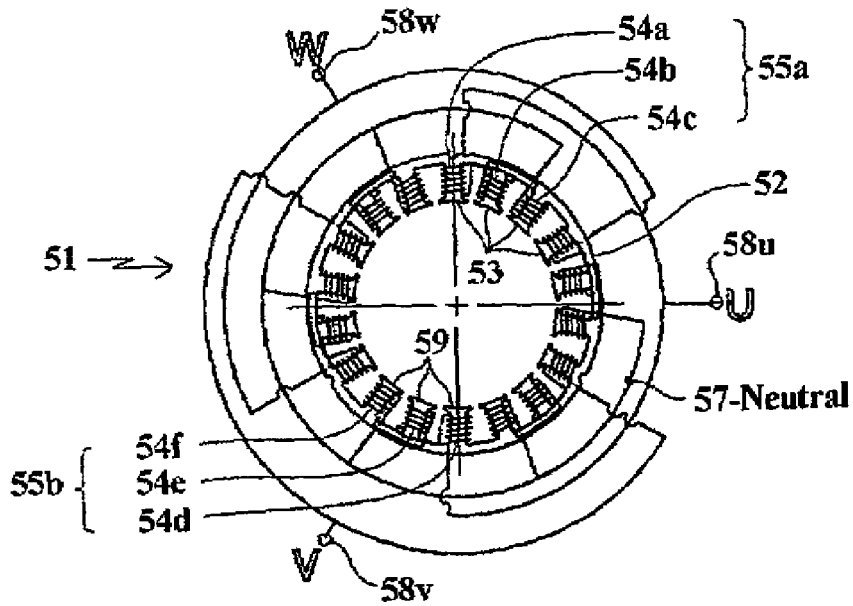
FIG. 1 is an end elevational view of three phase, Y wired, rotating electrical machine constructed in accordance with an embodiment of the invention.
Figure 2:
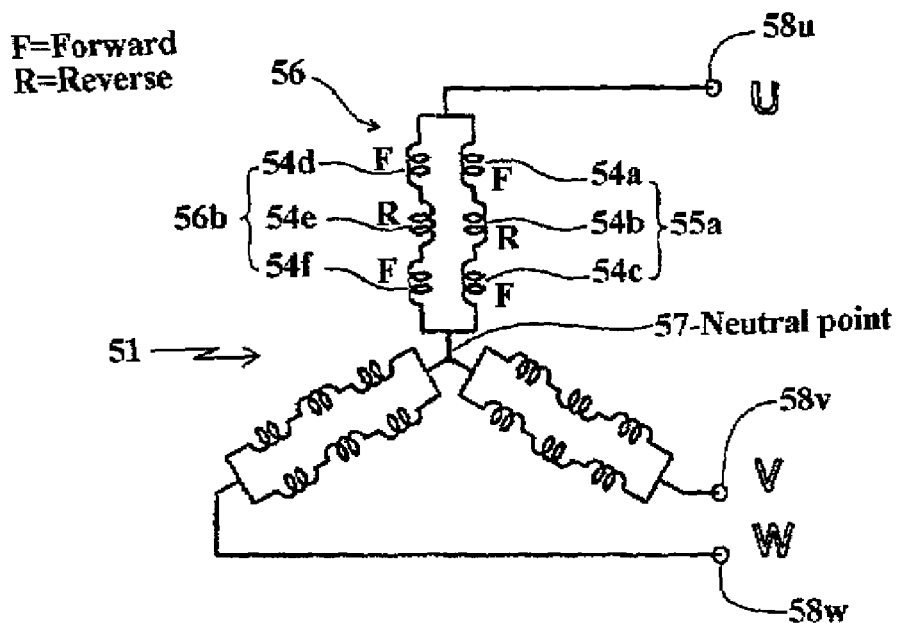
FIG. 2 is a wiring diagram showing how the coil windings of the three phases are connected.

Referring first to FIGS. 1 and 2, these figures show the construction of a first embodiment of the invention comprised of a 18-slot, 16-pole generator or motor, identified generally by the reference numeral 51. In the illustrated embodiments the coil winding element, indicated generally by the reference numeral 52, forms the stator and is wired in a Y arrangement. As will be apparent the coil winding element 51 may also comprise the rotor.

In FIG. 1, designated as 52 is an annular stator coil winding element having 18 magnetic pole teeth 53 extending radially inward. On each of the magnetic pole teeth 53 is wound a stator coil 54. A rotor or permanent magnet element (not shown) to which 16 permanent magnets are circumferentially fixed in an alternate fashion is rotatably held inside the stator 52. Namely, a permanent magnet type rotor having 16 poles rotates in the stator 52 having 18 slots (ditches). As noted above, the stationary and rotating elements may be reversed.

Because the invention relates to the winding of the coils 54 and the electrical connections between them, certain of the mechanical components of the machine 51 are not illustrated nor will they be described in any detail. Those skilled in the art will understand how the invention can be practiced with any desired machine construction and configuration.

16 permanent magnets are fixed to an outer periphery of the 16-pole rotor at regular intervals such that the polarities of the permanent magnets are changed alternately in N-S fashion. Magnets of the same polarity are disposed in positions symmetrical with each other with respect to the center of the rotation.

As for the magnetic pole teeth 53 of the stator 52 and their coil windings 54, the U phase comprises two sets of three coil windings each of which is disposed around three adjacent cores 53. The sets are circumferentially spaced from each other. The first of these sets comprises three stator coils 54a, 54b and 54c circumferentially disposed in succession. The second set comprises three stator coils 54d, 54e and 54f spaced circumferentially from the first set. Since the situation is the same for the V phase and the W phase, only the U phase will be described.

The circumferential intervals between the permanent magnets of the rotor are slightly larger than those of the magnetic pole teeth 53 of the stator 52. However, in a certain rotational angle position of the rotor, when coils 54a, 54c, 54d and 54f are wound in one direction and coils 54b and 54e are wound in the opposite direction, the polarities of all the coils 54 can be the same.

Thus, in this embodiment, a series circuit 55a comprising three coils 54a, 54b and 54c wound in alternating directions as mentioned above and a series circuit 55b comprising three coils 54d, 54e and 54f are connected in parallel as shown in FIG. 2. This parallel circuit indicated at 56 is a line current circuit. Namely, one end of the parallel circuit 56 is connected to a neutral point 57 and the other end thereof is employed as a terminal 58 (U) of the U phase.

Figure 3:
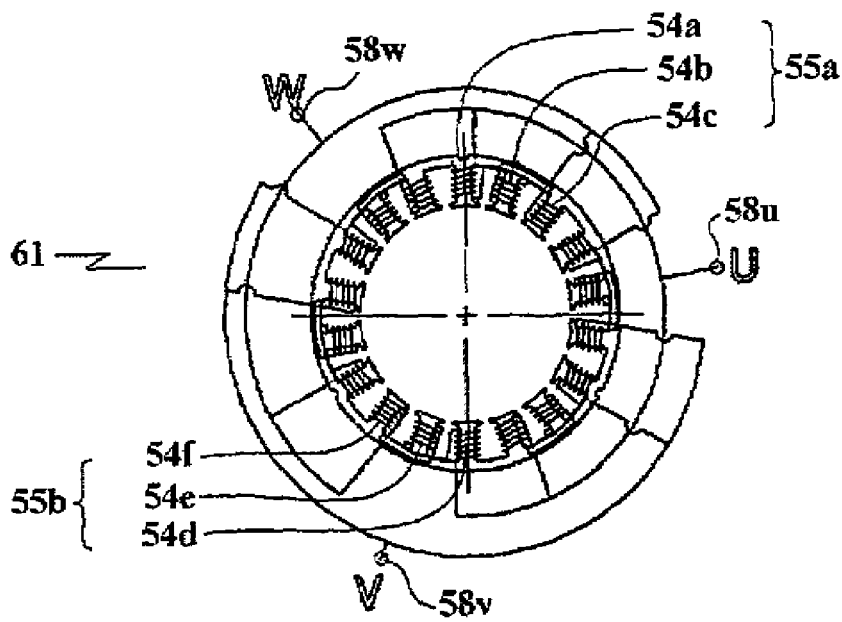
FIG. 3 is an end elevational view, in part similar to FIG. 1, showing another embodiment of the invention that is Δ wired.
Figure 4:
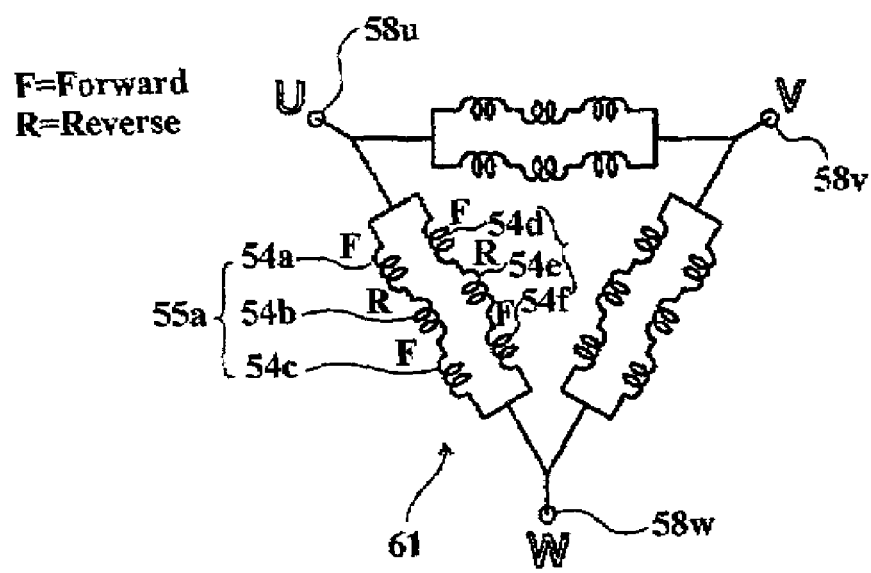
FIG. 4 is a wiring diagram, in part similar to FIG. 2, but showing the wiring of the coil phases of this embodiment.

FIGS. 3 and 4 illustrate a generator or a motor 61 with 18 slots and 16 poles employing a Δ-connection. In this embodiment, a line circuits which form the line voltage are provided by parallel circuits 56 similar to that in FIGS. 1 and 2. In FIGS. 3 and 4, parts corresponding to those in FIGS. 1 and 2 are designated by the same numerals and their description is not repeated because those skilled in the art will readily understand the construction and operation of this embodiment.

Figure 5:
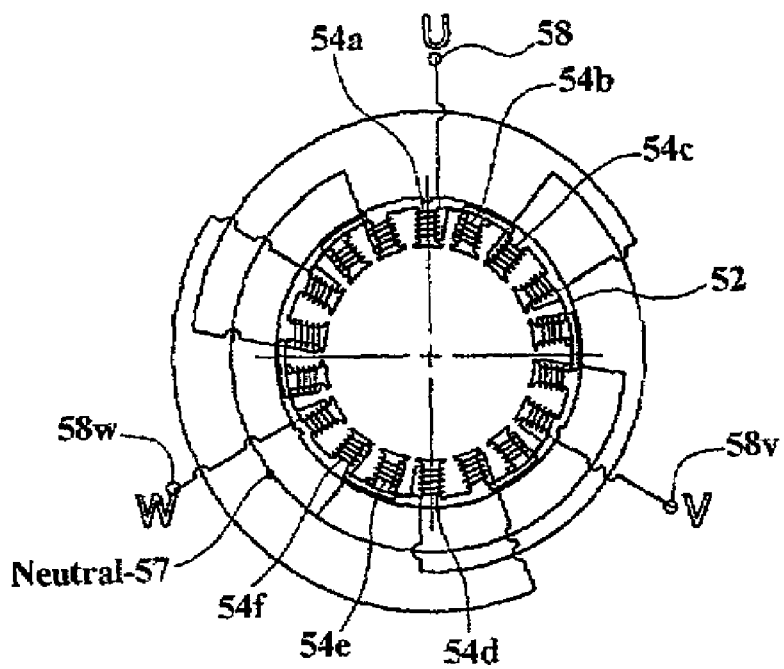
FIG. 5 is an end elevational view, in part similar to FIG.1, but showing a three phase, Y wired, rotating electrical machine of the type utilized in the prior art.
Figure 6:
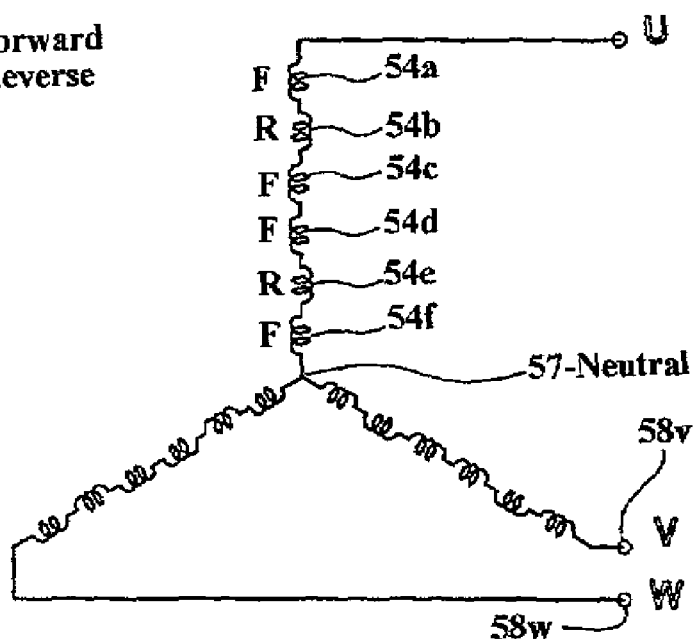
FIG. 6 is a view, in part similar to FIG. 2, and shows the wiring of the prior art type of device.

FIGS. 5 and 6 show a prior art construction for comparison with that of FIGS. 1 and 2 that also employs a Y-connection. As with the prior art, the 6 coils 54a to 54f forming the line current circuit of each phase are connected in series. In FIGS. 5 and 6, parts corresponding to those in FIGS. 1 and 2 are designated by the same numerals and their description is not repeated.

FIG. 7 is a view in part similar to FIG. 6 and is for comparison purposes with the inventive arrangement shown in FIGS. 3 and 4. A machine having this construction was driven by an electric motor and the driving amperage of the driving motor was measured. The same was done with the construction shown in FIGS. 3 and 4. Actual amperage to drive each machine is substantially the same, but as may be seen from a comparison of FIGS. 8, 9 and 10 with FIGS. 11, 12 and 13, the waveform in conjunction with the inventive structure is much more uniform and the total harmonic disturbances are substantially less as seen in the tables of FIGS. 11 and 13, respectively. Also, because of this construction, there is no substantially rotating counter current that could cause difficulties in performance.

Similar results would be obtained by comparing the embodiment of FIGS. 1 and 2 with the prior art constructions shown in FIGS. 5 and 6. That is, the efficiencies would be approximately the same, but the harmonic distortions would be much greater with the straight series connection than the parallel connection of series arrangements in accordance with the invention.

FIGS. 14 and 15, FIGS. 16 and 17 and FIGS. 18 and 19 show constructions of a 12-slot, 14-pole generators or a motor to explain another feature of the invention. The first two of these constructions (FIGS. 14 and 15 and FIGS. 16 and 17) embody the invention. The remaining construction shows the prior art for comparison.

Figure 14:
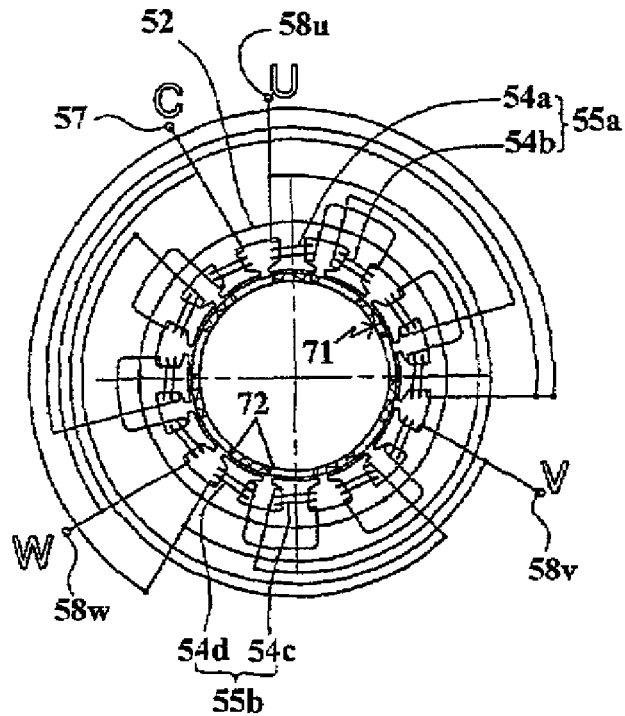
FIG. 14 is an end elevational view, in part similar to FIG. 1, but shows another coil winding arrangement.
Figure 15:
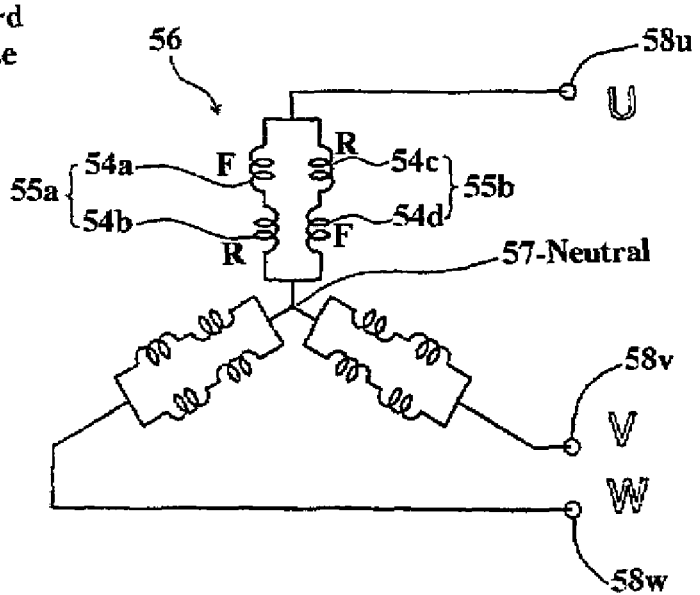
FIG. 15 is a schematic electrical diagram of the coil winding arrangement of this embodiment.

FIGS. 14 and 15 show an arrangement of magnetic pole teeth of a stator employing a Y-connection according to the present invention (Y parallel connection) and a coil wiring diagram thereof, respectively.

Figure 16:
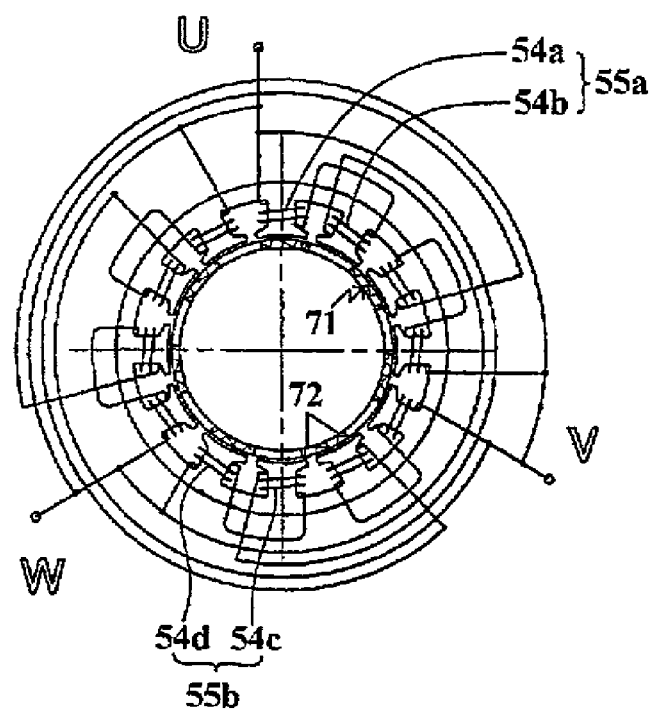
FIG. 16 is a view, in part similar to FIG. 3, but shows another embodiment of the invention.
Figure 17:
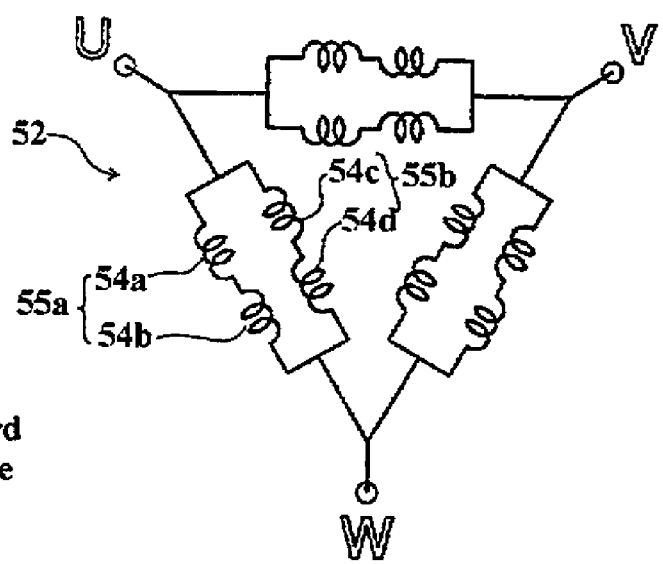
FIG. 17 is a schematic electrical diagram of the coil winding arrangement of this embodiment.
Figure 18:
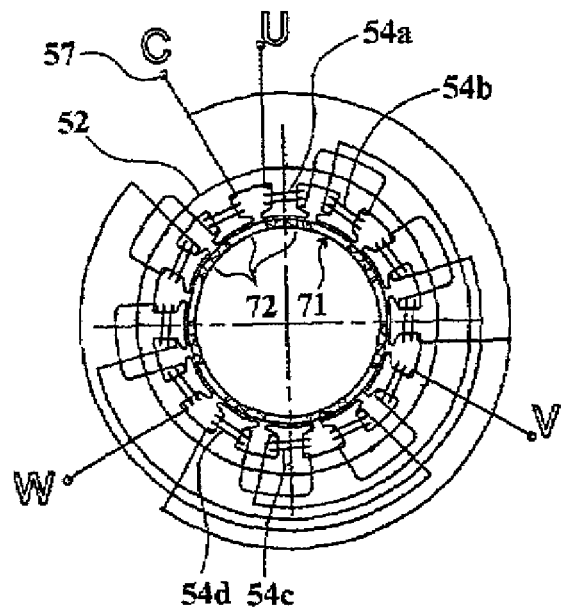
FIG. 18 is an end elevational view, in part similar to FIG. 5, and shows another prior art type of arrangement.
Figure 19:
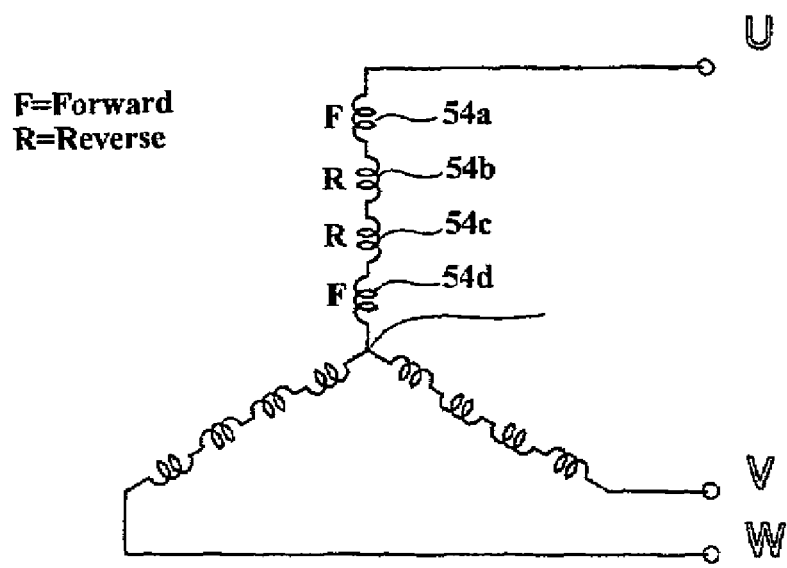
FIG. 19 is a schematic electrical diagram, in part similar to FIG. 6, but shows the wiring diagram for this embodiment.

FIGS. 16 and 17 show an arrangement of magnetic pole teeth of a stator of an embodiment employing a Δ-connection (Δ parallel connection) according to the present invention and a coil wiring diagram thereof (B). FIGS. 18 and 19 show and an arrangement of a comparative example of magnetic pole teeth of a stator and a coil wiring diagram thereof, respectively of the prior art construction having a Y connection.

In FIGS. 16 through 19, since the construction is the same as those previously described, except that the number of coils 54 forming each of the line current circuit or line circuits 55 is 4 (54a to 54d), corresponding parts are designated by the same numerals and their description is not repeated. In FIGS. 14, 16 and 18 the rotor 71 is shown. The rotor 71 has 14 permanent magnets 72 circumferentially arranged at regular intervals and in alternate fashion. The embodiments shown in FIGS. 14 and 15 and FIGS. 16 and 17 produce a similar result to the embodiments of FIGS. 1 and 2 and FIGS. 3 and 4.

Although embodiments having 18 slots and 16 poles and 12 slots and 14 poles have been specifically illustrated, the present invention is not limited to such embodiments. Other combinations of the number m of slots and the number n of poles are possible. When the number n of poles and the number m of slots have a common divisor, each of the coils of the plural serial circuits constituting the plural parallel circuits disposed in each phase or line will produce similar results.

The reason for this is that when there is a common divisor, 2 for example, the magnetic poles of the rotor are arranged symmetrically with respect to the center axis thereof and a plurality of coils forming two serial circuits in one parallel circuit are arranged symmetrically with respect to the center thereof. In this case, since the electromotive forces and the counter electromotive forces of the plural serial circuits are always the same, it is possible to eliminate a circulating current in the parallel circuit with certainty.

Each of the plural serial circuits forming the parallel circuit may be formed of one coil but is preferably formed of at least two coils. When formed of at least two coils, one parallel circuit takes at least 4 coils. Namely, the number m of slots is 3M (wherein M is a multiple of 2 or 3, at least 4) and m coils corresponding to one phase are divided into L sets each comprising M/L coils, whereby the electromotive forces or the counter electromotive forces of serial circuits in each set can be equalized.

In a permanent magnet type rotary electric machine, periodic changes of driving torque (which is called cogging torque) is generated when the rotor is rotated. It is preferable to decrease the cogging torque, because the driving torque can be decreased in the case of a generator and torque variation of output can be decreased in the case of a motor.

As one of conditions for improving the efficiency of a rotary electric machine, a winding coefficient Kw is known. When inclined slots are not employed, the winding coefficient Kw is represented by a product of a short-pitch winding coefficient Kp and a distributed winding coefficient Kd. Namely, Kw=Kp×Kd. The short-pitch winding coefficient Kp indicates a difference between a pitch of the coils and a pitch of the magnetic pole teeth and the distributed winding coefficient Kd indicates the degree of winding concentration of a coil.

FIG. 20 shows winding coefficients (lower row) and cogging torque frequencies (upper row) obtained with various combinations of the number m of slots (the number of magnetic pole teeth) and the number n of poles. It has been found that combinations in a region z between a line "x" and a line "y" represented by the following equations, respectively, are preferred.

Line x; m=(3/4)×n Line y; m=(3/4)×n Namely, with a combination in the region z, since the winding coefficient Kw is sufficiently large and the cogging torque frequency is large, the cogging torque will be relatively low. Thus, it is preferred that the number m of slots and the number n of poles be selected among the combinations in the region z.

As has been described, a line current circuit through which a phase current flow is formed by a parallel circuit formed by a plurality of serial circuits each comprising one or a plurality of stator coils so that electromagnetic voltage or counter electromagnetic voltage generated across opposite ends of the plural serial circuits may be always almost same. Thus, a circulating current does not flow in the parallel circuits, whereby the efficiency of the rotary electric machine can be improved. Also, since the line current circuit of each of the phases is constituted of a parallel circuit, the current flowing in each of the stator coils is small so that the diameter of the stator coil wire can be small. Thus, the winding of the coils can be improved. Also, the processing of the coil terminals is facilitated and the processed portions of the terminals can be made small, resulting in small-size rotary electric machine. Of course the foregoing description is that of preferred embodiments and various changes may be made without departing from the spirit and scope of the invention, as defined by the appended claims.

What is claimed is:

1. A permanent magnet type three-phase AC rotary electric machine including a permanent magnet element having a number of permanent magnet poles and a coil winding element having a number of slots, each of said three phases being connected in a line current circuit and being comprised of a parallel circuit formed by connecting a plurality of series circuits in parallel, said coil winding element comprising cores of each of said series circuits being encircled by alternately wound coils combined such that electromotive voltages or counter electromotive voltages generated across opposite ends of said plurality of series circuits forming each phase are substantially the same based on symmetry of arrangement of said permanent magnets and said coils, thereby preventing generation of a circulating current in said parallel circuit.

2. A permanent magnet type three-phase AC rotary electric machine as set forth in claim 1 wherein the permanent magnet element has n-number of permanent magnet poles and the coil winding element has m-number slots and the value of m is at least 6.

3. A permanent magnet type three-phase AC rotary electric machine as set forth in claim 2 wherein the number n of poles and said number m of slots have a common devisor.

4. A permanent magnet type three-phase AC rotary electric machine as set forth in claim 2 wherein the number m of slots is a multiple of 3 represented as 3M, M is at least 4, M coils corresponding to one phase are divided into L sets each comprising M/L coils connected in series.

5. A permanent magnet type three-phase AC rotary electric machine as set forth in claim 2 wherein the number n of poles and the number m of slots satisfy the following relations, respectively;

$$n=2N,\ m=3M$$

wherein N and M are integers, and also satisfy the following equation;

$$2m/3<n<4m/3.$$

6. A permanent magnet type three-phase AC rotary electric machine as set forth in claim 1 wherein the phases are connected in a Y configuration.

7. A permanent magnet type three-phase AC rotary electric machine as set forth in claim 6 wherein the permanent magnet element has n-number of permanent magnet poles and the coil winding element has m-number slots and the value of m is at least 6.

8. A permanent magnet type three-phase AC rotary electric machine as set forth in claim 1 wherein the phases are connected in a Δ configuration.

9. A permanent magnet type three-phase AC rotary electric machine as set forth in claim 8 wherein the permanent magnet element has n-number of permanent magnet poles and the coil winding element has m-number slots and the value of m is at least 6.

* * * * *